United States Patent [19]

Wobbe

[11] Patent Number: 4,900,494
[45] Date of Patent: Feb. 13, 1990

[54] EXTRUSION METHOD AND APPARATUS

[75] Inventor: Hans Wobbe, Burgdorf, Fed. Rep. of Germany

[73] Assignee: Hermann Berstorff Maschinenbau GmbH, Hanover, Fed. Rep. of Germany

[21] Appl. No.: 310,641

[22] Filed: Feb. 15, 1989

[30] Foreign Application Priority Data

Feb. 24, 1988 [DE] Fed. Rep. of Germany ...... 3805748

[51] Int. Cl.$^4$ .................. B29C 47/60; B29C 47/76
[52] U.S. Cl. .................. 264/102; 264/211.23; 425/203; 425/812; 366/75; 366/89; 366/99; 366/139; 366/323
[58] Field of Search .............. 264/39, 102, 211.23, 264/DIG. 78; 425/203, 225, 226, 227, 229, 230, 232, 812; 366/75, 89, 99, 139, 323

[56] References Cited

U.S. PATENT DOCUMENTS

| | | | |
|---|---|---|---|
| 3,376,603 | 4/1968 | Colombo | 425/203 |
| 3,719,350 | 3/1973 | Loomans | 366/75 |
| 3,811,658 | 5/1974 | Heidrich | 366/139 X |
| 4,103,354 | 7/1978 | Gorbatov et al. | 366/139 X |
| 4,265,547 | 5/1981 | Martin | 366/75 X |
| 4,573,799 | 3/1986 | Anders | 366/89 |

FOREIGN PATENT DOCUMENTS

| | | | |
|---|---|---|---|
| 82494 | 6/1983 | European Pat. Off. | 425/203 |
| 49-42910 | 11/1974 | Japan | 425/203 |
| 59-118438 | 7/1984 | Japan | 425/203 |
| 59-120435 | 7/1984 | Japan | 264/40.1 |
| 592605 | 2/1978 | U.S.S.R. | 264/102 |

Primary Examiner—Jeffery Thurlow
Assistant Examiner—Leo B. Tentoni
Attorney, Agent, or Firm—Foley & Lardner, Schwartz, Jeffery, Schwaab, Mack, Blumenthal & Evans

[57] ABSTRACT

An apparatus including a single screw extruder for extruding a fused molten mass of thermoplastic material and for reverse degassing the melt. The device includes an extrusion screw rotatable in a hollow cylindrial barrel, and a hopper for introducing the melt into the barrel. The screw has at least one flight for conveying the introduced melt and a return delivery flight disposed upstream, in the direction of extrusion, of the hopper. Reverse degassing of the melt is effected by a vacuum source disposed upstream of the hopper in communication with the return delivery section, and provided with a degassing dome generating a reduced pressure or vacuum. At least one radially adjustable separating member for effecting mechanical separation of fused mass from the gas is provided in at least one location in the return delivery section. The method includes degassing of the melt by producing a reduced pressure in the return delivery section. The gas extracted from the melt is discharged. However, the degassing will cause some of the fused mass to enter the return delivery section. The fused mass is separated from the gas by mechanical separators in the return delivery section.

7 Claims, 1 Drawing Sheet

EXTRUSION METHOD AND APPARATUS

FIELD OF THE INVENTION

The present invention relates to an extrusion method and apparatus. More particularly, the present invention relates to an extrusion method and apparatus wherein the extrusion is effected in a single-screw extrusion device but in which, simultaneously, reverse degassing is effected. As is well known in the art, reverse degassing means that any volatile material contained in the melt fed into the extruder is transmitted rearwardly, that is to say, in the direction of travel opposite to the direction of extrusion and is thus removed.

BACKGROUND OF THE INVENTION AND PRIOR ART DISCUSSION

In East German Patent Specification No. 99 949, there is disclosed a reverse degassing extrusion apparatus. In this prior arrangement, a fused mass of plastic material is introduced into an extrusion device from a feed hopper whereupon it is collected by an extrusion screw rotating in a barrel and is advanced. A transmission mechanism, including a drive shaft, is provided for the extrusion screw and a return delivery thread is provided around the upstream end of the screw to prevent any fused material from penetrating into the transmission mechanism and causing damage thereto.

A vacuum source, which generates a reduced pressure or vacuum, communicates with the space around the transmission mechanism end of the drive shaft for the screw, which space is rearwardly or upstream of the return delivery thread. The vacuum source removes gaseous monomer components and the like, which have been introduced into the feed region of the screw with the melt through the hopper, through the return delivery thread by suction. The gas is then discharged.

During the course of such an extrusion process, occurrences of contamination of the return delivery thread by the melt will inevitably arise both during operation of the apparatus and whilst it is not in use. This reduces the cross-sectional area of the return delivery threads and this, in turn, causes the flow rate of the gas in the return delivery thread to be increased by virtue of the vacuum acting thereon. As soon as the gas flow rate exceeds a limit value, particles of fused material are also removed by suction from the region of the feed hopper and pass through the reverse degassing means, in addition to the gas. This is highly undesirable because it causes the deposit of the melt which further reduces the free cross-sectional area of the return delivery thread. In addition, the vacuum pump may become contaminated by the particles of the fused material and, in such circumstances, will eventually be rendered inoperative.

OBJECT OF THE INVENTION

The invention seeks to provide an extrusion method and apparatus in which the above-described disadvantages are eliminated, or at least minimized. In other words, the present invention seeks to provide an extrusion method and apparatus in which reverse degassing an be achieved without incurring the problems associated with contamination by the molten material.

SUMMARY OF THE INVENTION

According to the present invention, there is provided a method of extruding a fused mass of a thermoplastic material in a single screw extruder including a step of reverse degassing the mass of the extruder screw including a return delivery section including a return delivery thread disposed upstream the degassing is effected by providing a vacuum source communicating with the return delivery thread through a degassing aperture, whereby gas present in the melt is removed from the return delivery thread by the reduced pressure produced by the vacuum source and is discharged, the method including the additional step of mechanically separating the gas from any fused mass entrained therein at at least one location in said return delivery section.

Also according to the present invention, there is provided an apparatus for extruding a fused mass of thermoplastic material comprising a single-screw extrusion device and means for reverse degassing the melt, the extrusion device comprising an extrusion screw rotatable in a hollow cylindrical barrel, and hopper means for introducing the melt into the barrel, the screw having at least one flight disposed thereon for effecting conveyance of the introduced melt and a return delivery section including a return delivery flight or thread disposed upstream, in the direction of extrusion, of the hopper means, the means for effecting the reverse degassing of the melt comprising a vacuum source disposed upstream of the hopper means, the vacuum source being in communication with the return delivery section and with a degassing dome and generating a reduced pressure or vacuum, wherein at least one separating member for effecting mechanical separation of any deposits of fused mass from the gas is provided in at least one location in the return delivery section, the separating member being radially adjustable in a direction towards and away from the longitudinal axis of the screw from externally of the barrel of the extrusion device.

As as result of the mechanical separation of the deposits of fused mass on the return delivery flight or thread of the screw, molten material accumulates downstream of the separating member between the internal wall of the hollow barrel of the extrusion device and the score of the screw.

As a result of contact being established between the fused mass with the core of the screw and the internal wall of the barrel, the molten material is caused to return in the direction of extrusion. Return delivery is achieved because of the rolling movement of the solid particles of material in the pitches of the return delivery thread on the internal wall of the barrel.

Because of the rotation of the screw, this return delivery process of the solid material takes place over the entire length of the return delivery flight or thread. The return delivery thread is thus cleared of solid deposits, and the removal of the gas by suction provided the vacuum pump is restored to optimum operation.

To achieve this in a practical embodiment, the separating members may each be radially inwardly displaced until they lie closely adjacent the core of the screw for a period of one minute in every five minutes. The solids accumulating in the return delivery flight or thread are thus regularly removed and extruded. The screw flights in the return delivery section are discontinuous at the location or locations where the separating member or members are radially inserted into the barrel of the extrusion device so that they can lie adjacent the screw core.

BRIEF DESCRIPTION OF THE DRAWINGS

One embodiment of an extruder device in accordance with the present invention will be further described, by way of example, with reference to the accompanying drawing, in which.

DESCRIPTION OF PREFERRED EMBODIMENT

Figure 2:
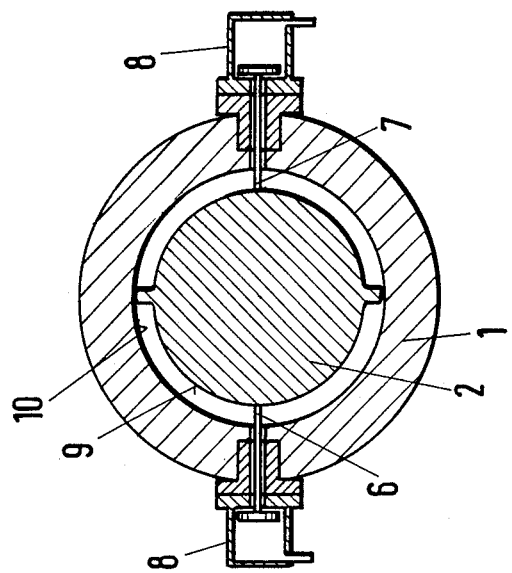
FIG. 2 is a cross-sectional view, taken along either of the lines II—II of FIG. 1.
Figure 1:
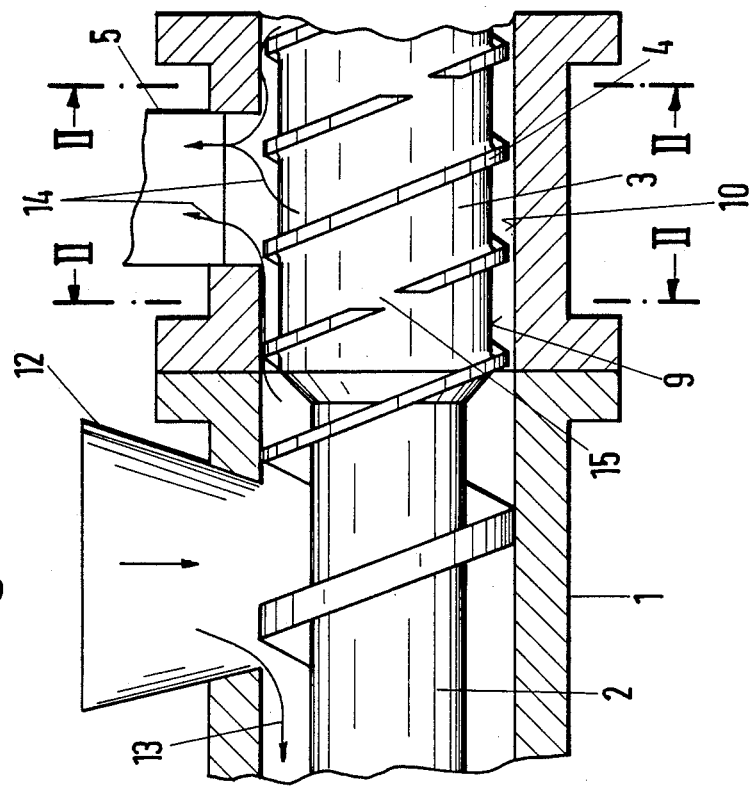
FIG. 1 is a longitudinal, cross-sectional view through the inlet end of a single-screw extrusion device.

In the drawings, there is shown a single-screw extrusion device which comprises a rotatable screw 2 disposed within an extruder barrel 1. A molten mixture is fed into the extruder through a feed hopper 12 and is conveyed and extruded by the screw 2 in the direction of arrow 13. Upstream, in the direction of conveyance of the melt, of the feed hopper 12, the screw 2 is provided with a return delivery thread, a portion of which is denoted by 3. The screw, in such region, is provided with a return delivery flight 4, which is discontinuous at locations 15 in order to permit separating means, in the form of rods 6 and 7 to be inserted radially inwardly through the barrel 1 of the extrusion device. The rods 6 and 7 are radially displaceable so as to penetrate substantially to the core 9 of the screw 2 in the portion 3. Further upstream of the return delivery thread is a transmission mechanism for rotating the screw 2.

A degassing dome 5 is disposed above the return delivery portion 3 and a vacuum pump (not shown) communicates with the dome. This arrangement removes gas present in the return delivery suction in the direction of arrow 14.

The two separating rods 6 and 7 can be seen more clearly in the cross-sectional view shown in FIG. 2. The radial displacement thereof is effected by means of pneumatic piston and cylinder arrangements 8. In this embodiment, and extension portion of the piston rod of each pneumatic piston and cylinder arrangements forms a separating rod 6 or 7.

The pneumatic piston and cylinder arrangements 8 are actuated for approximately one minute at predetermined intervals, for example every five minutes, by means of a control mechanism (not shown). Actuation of these arrangements causes the separating rods 6 and 7 to move radially inwardly into the extrusion chamber until the ends thereof are located adjacent the core 9 of the screw 2. Any solid material deposits present in the gas flow accumulates downstream of the rod 6 and 7 and eventually contacts the internal wall 10 of the barrel 1. The deposits are thus caused to move forwardly, in the direction of arrow 13. Once this has been initially achieved, the action is continuous and all deposits are removed from the screw flights in the return delivery portion 3. Accordingly, the entire cross-sectional area of the pitch of the screw is re-available to the gaseous material.

I claim:

1. A method of extruding a fused molten mass of a thermoplastic material in a single screw extruder comprising a hollow barrel, a single screw rotatable within said hollow barrel, inlet means for introducing said melt into said barrel and melt discharge means disposed in said barrel downstream of said inlet means, said extruder including a return delivery section upstream of said inlet means, said screw including a return delivery flight in said return delivery section, said barrel means defining a degassing aperture in said return delivery section and vacuum source means communicating with said return delivery section through said degassing aperture, comprising the steps of introducing said melt into said barrel through said inlet means, extruding said melt in said barrel by rotating said screw, actuating said vacuum source means to degas said melt whereby said gas is caused to enter said return delivery section by the reduced pressure produced by said vacuum source, is caused to pass through said aperture and is discharged, said method including the additional step of mechanically separating said gas from any fused mass entrained therewith at at least one location in said return delivery section.

2. A method as recited in claim 1, wherein said mechanical separation step is effected discontinuously at spaced timed intervals for a predetermined period of time.

3. An apparatus for extruding a fused molten mass of thermoplastic material comprising hollow cylindrical barrel means, screw means rotatable in the interior of said barrel means, feed hopper means for introducing said fused mass into said barrel means and discharge means associated with said barrel means and disposed downstream of said feed hopper means for discharging said fused mass conveyed and extruded by said screw means, said screw means and said barrel means jointly forming a delivery section for said melt extending downstream from said feed hopper means to said discharge means and a return delivery section disposed upstream of said feed hopper means, said barrel, in said return delivery section, defining an aperture, and said screw means, in said return delivery section, comprising a core and a return delivery thread helically disposed around said core, vacuum source means communication with the interior of said barrel through said aperture for reducing the pressure in said barrel so as to cause degassing of said melt, means for collecting and discharging said gas removed from said melt by said reduction of pressure, and at least one means for mechanically separating any melt in said return delivery section from said gas, each said separating means including first means disposed within said barrel and extending radially towards said core of said screw in said return delivery section and second means mounted on the exterior of said barrel and acting upon said first means for adjusting the radial penetration of said first means in a direction towards said screw core.

4. An apparatus as recited in claim 3, wherein each said first separating means comprises a pin member and each said second separating means comprises a pneumatic piston and cylinder arrangement acting on said pin.

5. An apparatus as claimed in claim 4 wherein each said piston and cylinder arrangement comprises a piston rod and said pin member is connected to said piston rod.

6. An apparatus as recited in claim 4 wherein each said piston and cylinder arrangement includes a piston rod and wherein said pin member forms an extension portion of said piston rod.

7. An apparatus as recited in claim 3 additionally comprising means for controlling the radial penetration of each said mechanical separation means and for effecting such penetration at pre-selected time intervals, and means for controlling the period of time for which each said mechanical separation means is located at its desired radial location.

* * * * *